Figure 1:
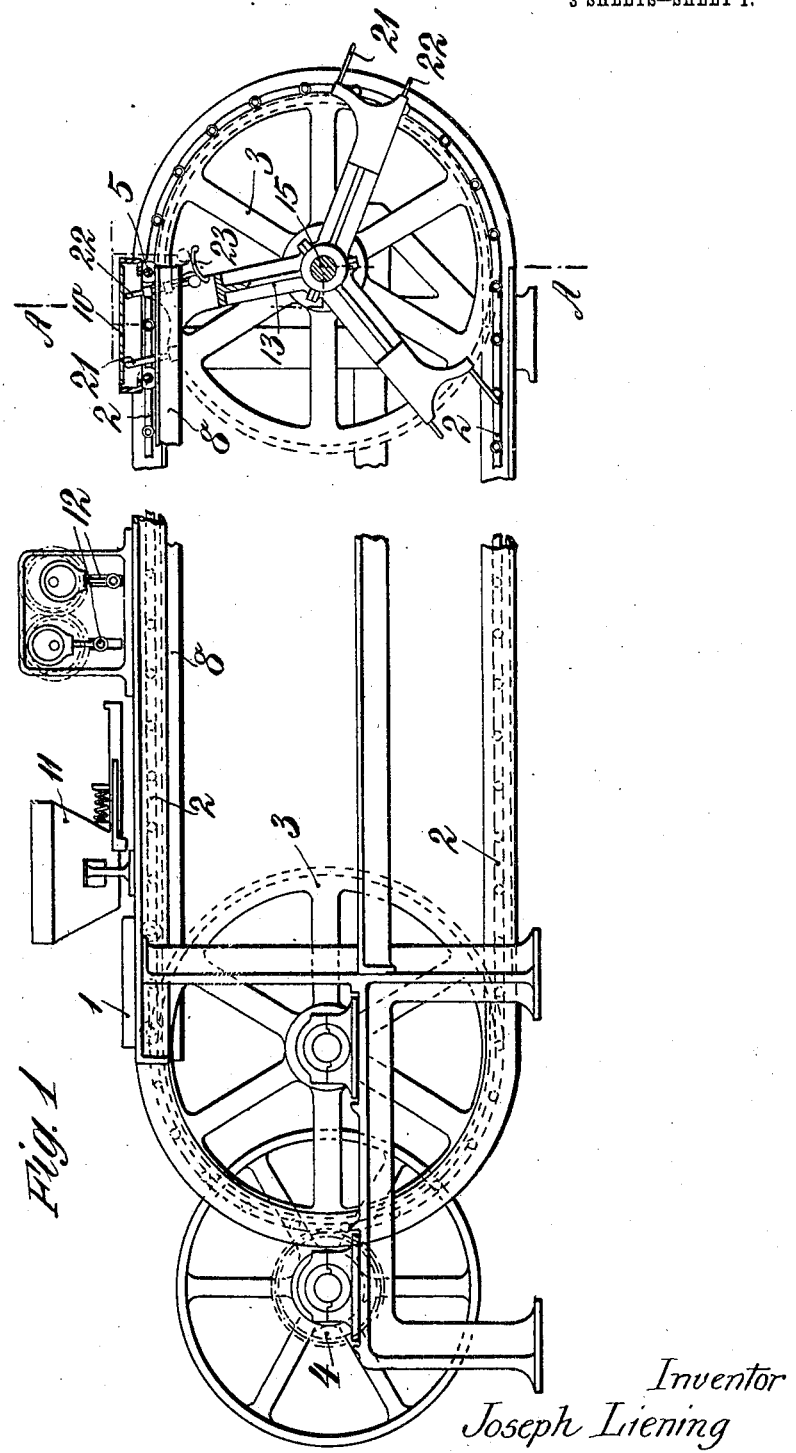

No. 844,602. PATENTED FEB. 19, 1907.
J. LIENING.
MACHINE FOR MAKING CEMENT ROOFING TILES.
APPLICATION FILED AUG. 13, 1906.

3 SHEETS—SHEET 1.

Witnesses

Inventor
Joseph Liening
By
Attorneys

No. 844,602. PATENTED FEB. 19, 1907.
J. LIENING.
MACHINE FOR MAKING CEMENT ROOFING TILES.
APPLICATION FILED AUG. 13, 1906.
3 SHEETS—SHEET 2.
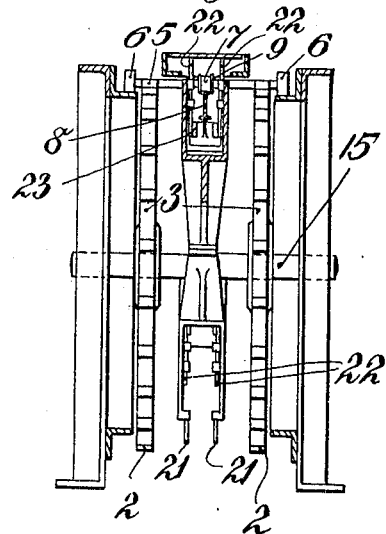
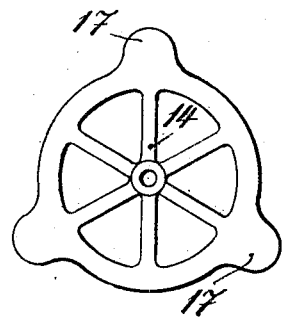
Witnesses
Inventor
Joseph Liening
By H. B. Willson & Co.
Attorneys No. 844,602.
PATENTED FEB. 19, 1907.
J. LIENING.
MACHINE FOR MAKING CEMENT ROOFING TILES.
APPLICATION FILED AUG. 13, 1906.
3 SHEETS—SHEET 3.
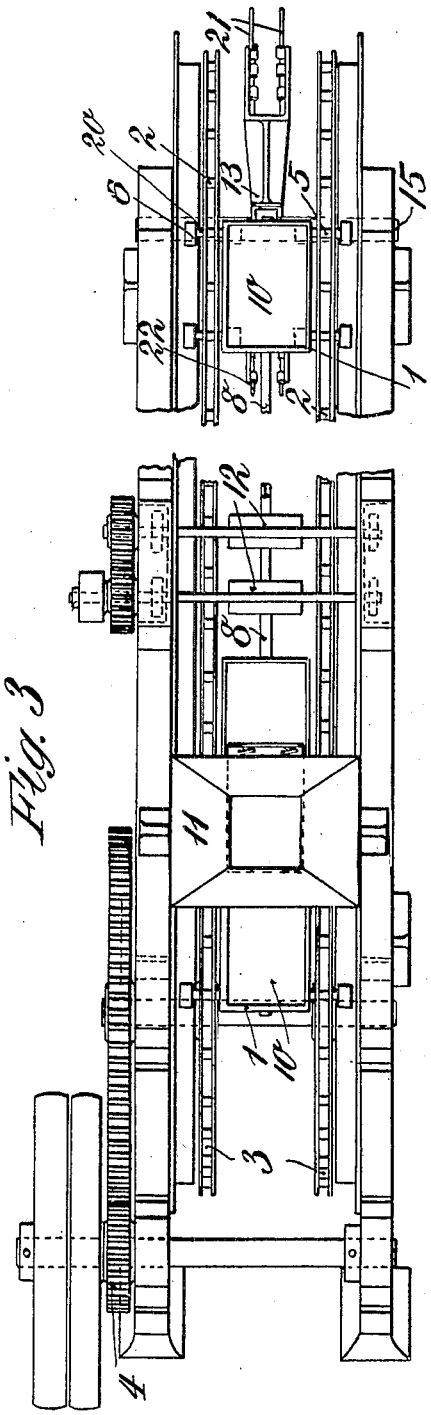
Witnesses
Inventor
Joseph Liening
By H. B. Willson & Co
Attorneys

UNITED STATES PATENT OFFICE.

JOSEPH LIENING, OF LEER, GERMANY.

MACHINE FOR MAKING CEMENT ROOFING-TILES.

No. 844,602.            Specification of Letters Patent.            Patented Feb. 19, 1907.

Application filed August 13, 1906. Serial No. 330,502.

*To all whom it may concern:*

Be it known that I, JOSEPH LIENING, manufacturer, a citizen of Germany, a subject of the King of Prussia and Emperor of Germany, residing at Leer, 9 Georgstrasse, in the Kingdom of Prussia and Empire of Germany, have invented a new and useful Improvement in a Machine for Making Cement Roofing-Tiles, of which the following is a specification.

The present invention refers to a machine for making cement roofing-tiles, the essential feature of which is the manner in which the finished tiles are removed from the machine.

In the manufacture of cement roofing-tiles it has been experienced that it was difficult to remove the tiles finished in the machine for subjecting them to the further processes—drying and the like. In the present invention this difficulty is overcome by the finished tiles being removed from the machine, together with the bottoms of the molds on which they have been standing during the course of their manufacture, the machine automatically effecting the raising of the mold-bottoms, so that their removal is very quick, safe, and easy.

A mode of carrying out the machine is exemplified in the accompanying drawings.

Figure 1 is a side elevation. Fig. 2 is a vertical section along A A in Fig. 1. Fig. 3 is a plan of the machine, and Fig. 4 is a somewhat modified design of a detail.

The molds 1 are attached in suitable and equal distances from each other to endless-chain conveyers 2, running over sprocket-wheels 3 on both sides of the machine. Said sprocket-wheels are mechanically geared by means of a counter-shaft 4. The molds 1 rest on axles 5, having rollers 6 at either end. These rollers 6 run on ways formed by the bed of the machine. On both sides of the axles 5 are coupled at 20 the conveyer-chains 2. In the middle of said axles rollers 7 are arranged which roll on a guide—in the present instance a girder 8—as the conveyer-chains advance with the molds. The rollers 7 serve to receive the vertical pressure produced during the process of manufacture by filling in and stamping down the cement and the like and to prevent the axles 5 from bending. The rollers 7 are suitably provided with lateral flanges or shoulders 9, so as to avoid of the molds having a lateral play.

The molds 1 have loose bottoms 10, which rest only in their corners, as may be seen in Fig. 3, and completely close the molds below.

Above the chain conveyers the devices for carrying out the various processes of manufacture are arranged.

11 is the cement-charging hopper, by means of which a given quantity of cement is filled into the mold beneath it.

12 are rams for stamping the cement and are operated, for instance, by eccentrics.

Of course many more devices may be provided in the machine above the chain conveyers, according to the number of processes to be gone through by the cement tiles, as molding-tanks, rinsing arrangements, tools for profiling the surface of the tiles, and the like may be provided. All these devices work automatically, being in connection with the forward-moving chain conveyers or molds or having gears, being in any connection with the counter-shaft 4, which operates the whole machine. These parts, however, are not all shown in the drawings, as the essential feature of the present invention is the manner in which the tiles made by any process are removed from the machine.

At the rear end of the machine between the sprocket-wheels 3 is provided the arrangement for raising the mold-bottoms with the finished tiles resting on them. This arrangement consists of a spider 13 or a disk 14, having arms or cams. The spider or disk respectively is fitted to the same shaft 15 as wheels 3 at the rear end of the machine, so that it will have the same motion as the sprocket-wheels and the chain conveyers, respectively.

In Fig. 1 of the accompanying drawings is shown in what manner the spider 13 will raise the finished tiles on the mold-bottoms. The number of rams on the spider or of cams on the disk, respectively, is chosen according to the distance between the single molds. As soon as a mold with the finished tile has reached the rear end of the machine an arm of the spider suitably fitted with dog-pins 21 22 will catch under the loose bottom 10 of the mold. As the mold advances, the spider turning on at the same time, the dog-pins raise the bottom so that it stands above the mold, as shown in Fig. 1, dotted lines. In such an elevated position it is easily reached by the attendant and readily removed. The finished tile needs not be touched by the attendant, what is of great importance owing to the softness of the material forming the tile.

The dog-pins 21 22 are attached to the spider in the particular manner shown in Figs. 1 and 2 of the drawings. One of the dog-pins 21 is attached rigidly, while the other, 22, may move longitudinally in the radial sense. The two dog-pins having caught the loose bottom of a mold, the movable one, 22, engages with its inner end a suitably-formed guide 23, attached to the girder 8 or to any other part of the bed of the machine, whereby the dog-pin 22 is raised in such a manner that the bottom of the mold with the tile remains perfectly in horizontal position during the whole operation of raising.

In place of the spider, as said above, a cam-disk may be used, as shown in Fig. 4 on the drawings. The arms 17 of said cam-disk 14 act in the same manner as the dog-pins 21 22 of the spider.

The raising arrangement for the mold-bottoms, with the finished tiles, offers a further advantage besides allowing of the tile being removed without its being damaged. If the mold-bottom, with the tile, has not been removed, because the tile is not well made or owing to carelessness of the attendant, the cement-roofing-tile machine will automatically remove the mold-bottom with the tile. When the bottom has been raised, the chain, with the molds, will turn into a vertical direction and the mold-bottom will glide by itself out of the machine. There will thus be a constant supply of empty molds for a renewal of the manufacturing process, so that stoppages cannot occur by the same mold being twice filled.

Having now fully described and ascertained my said invention and the manner in which it is to be preformed, I declare that what I claim is—

1. In a machine for the manufacture of cement roofing-tiles, the combination of molds for the tiles having removable bottoms arranged therein, endless-chain conveyers for automatically conducting the molds consecutively to the different devices for making the tiles, means for vertically turning the endless-chain conveyers with the molds after they have left the last of said devices, means for raising the removable bottoms above the edges of said molds with the tiles resting upon them before they are turned said means being arranged below the molds and so disposed that the bottoms are raised by them above the edges of the mold.

2. In a machine for the manufacture of cement roofing-tiles, the combination of molds for the tiles having removable bottoms loosely arranged therein, endless-chain conveyers for automatically conducting said molds consecutively to the different devices for making the tiles, means for vertically turning the endless-chain conveyers with the molds thereon after they have left the last of said devices, a spider for raising said removable bottoms above the edges of the molds before the vertical turn, dog-pins on the end of each spider-arm for engaging the removable bottoms, some of said dog-pins being movable, and means for moving said movable dog-pins to raise the loose bottoms into horizontal position.

3. In a machine for the manufacture of cement roofing-tiles, molds for the tiles, loose bottoms in said molds, endless-chain conveyers for automatically conducting such molds one after the other to the different devices for making the tiles, means for turning the endless-chain conveyers with the molds vertically after their having left the last of said devices, a spider for raising said loose bottoms before the vertical turn of the molds, said spider being rotatably arranged below the filled molds and within the room inclosed by the endless-chain conveyers, said spiders keeping said bottoms in the raised position, dog-pins on the end of each spider-arm for engaging the loose bottoms, some of said dog-pins being arranged movably, means for moving said movable dog-pins in such a manner that the loose bottoms are raised in horizontal position.

In testimony whereof I have hereunto set my hand in presence of two subscribing witnesses.

JOSEPH LIENING.

Witnesses:
HENRY HASPER,
WILLIAM MAYNER.